United States Patent
Treusch et al.

(10) Patent No.: US 6,848,477 B2
(45) Date of Patent: Feb. 1, 2005

(54) FUEL PRESSURE DAMPING SYSTEM AND METHOD

(75) Inventors: Christopher John Treusch, St. Clair Shores, MI (US); Joe Zhi Li, Northville, MI (US); Robert Eugene Wattleworth, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/342,030

(22) Filed: Jan. 14, 2003

(65) Prior Publication Data

US 2004/0134550 A1 Jul. 15, 2004

(51) Int. Cl.⁷ .............................................. F16L 55/04
(52) U.S. Cl. .......................... 138/44; 138/26; 138/37; 123/456; 123/467
(58) Field of Search ............................ 138/28, 30, 112, 138/108, 44, 26, 37; 123/456, 467

(56) References Cited

U.S. PATENT DOCUMENTS

| | | | | |
|---|---|---|---|---|
| 3,665,967 A | * | 5/1972 | Kachnik | 138/137 |
| 4,014,366 A | * | 3/1977 | Critendon | 138/44 |
| 4,056,679 A | * | 11/1977 | Brandt et al. | 174/13 |
| 4,544,332 A | | 10/1985 | Shibuya | 417/269 |
| 4,644,974 A | * | 2/1987 | Zingg | 138/44 |
| 4,651,781 A | * | 3/1987 | Kandelman | 138/30 |
| 4,897,906 A | * | 2/1990 | Bartholomew | 29/890.09 |
| 5,575,262 A | * | 11/1996 | Rohde | 123/467 |
| 5,709,248 A | * | 1/1998 | Goloff | 138/30 |
| 5,927,239 A | | 7/1999 | Kohrs et al. | 123/90.17 |
| 6,314,942 B1 | * | 11/2001 | Kilgore et al. | 123/467 |
| 6,390,131 B1 | * | 5/2002 | Kilgore | 138/30 |

FOREIGN PATENT DOCUMENTS

| | | |
|---|---|---|
| DE | 19516358 | 5/1995 |
| GB | 2147962 | 5/1985 |
| JP | 8261097 | 3/1995 |
| JP | 8303679 | 5/1995 |
| JP | 9257186 | 3/1996 |
| JP | 2000073907 | 9/1998 |
| SU | 1686246 | 7/1988 |

* cited by examiner

Primary Examiner—Patrick Brinson
(74) Attorney, Agent, or Firm—Brinks Hofer Gilson & Lione (57) ABSTRACT

The invention relates to a fuel pressure damping system for use in a hydraulic system. The invention introduces specifically sized restrictors in the fuel passage to control the maximum operating system pulse magnitude as well as damping the overall pulsations of the system.

16 Claims, 7 Drawing Sheets

FUEL PRESSURE DAMPING SYSTEM AND METHOD

FIELD OF THE INVENTION

The present invention relates generally to fuel pressure damping systems, and more particularly to a low cost fuel pressure damper system and a method of damping pulsations in fuel systems.

DISCLOSURE INFORMATION

Conventional methods of damping a fuel system rely solely on inclusion of a member that introduces more compliance, thereby reducing the bulk modulus. This is often accomplished through the use of a flexible wall or walls in a member that is in liquid communication with the pulsating fuel to absorb the pressure fluctuations within the system.

Adding compliance is not always sufficient to relieve all of the objectionable pressure variations in the fuel system however, resulting in unwanted variation of the fuel injector performance as well as objectionable noise, vibration and harshness. In some systems where adding sufficient compliance is possible it may not be commercially feasible or physically practical to introduce a custom designed compliance damping system. The additional compliance may make certain members to weak to function properly or require expensive materials to achieve the desired effect. Additionally, a problem arises when the injector frequency excites one of the various resonant modes of the fuel rail or other system component. At these frequencies the maximum operating system pulse magnitude can increase to several times normal operating levels. Attempting to resolve these resonant frequency issues simply by adding more compliance can result in other unwanted effects. Adding more compliance may allow more pulsations to be absorbed, but it will also result in a shift in resonant frequency. As compliance is increased, the resonant frequency modes shift to lower frequencies. When the modes shift lower, higher modes that were previously above the operating frequency range of the fuel system may shift into the operating frequency of the fuel system. Therefore, adding more compliance can sometimes result in more objectionable resonant frequency modes than before.

It would be desirable, therefore, to provide a means of damping objectionable pressure fluctuations and limiting the maximum operating system pulse magnitude other than merely adding compliance.

SUMMARY OF THE INVENTION

The present invention overcomes the disadvantages of conventional compliance damping approaches by including one or more restrictors that work in conjunction with the systems compliance dampers or inherent compliance to achieve the desired damping of pressure fluctuations practically, cost effectively and in a way that does not lower additional harmonic modes into the operating frequency range of the fuel system. The invention introduces specifically sized restrictors in the fuel passage to control the maximum operating system pulse magnitude as well as damping the overall pulsations of the system.

It is an object and advantage that the present invention results in avoiding objectionable pressure fluctuations in a fuel system in a practical, cost effective way.

It is an additional object and advantage that the present invention results in limiting maximum operating system pulse magnitudes without introducing additional harmonic modes into the operating frequency range of the fuel system.

These and other advantages, features and objects of the invention will become apparent from the drawings, detailed description and claims, which follow.

DESCRIPTION OF THE PREFERRED EMBODIMENT(S)

Figure 1:
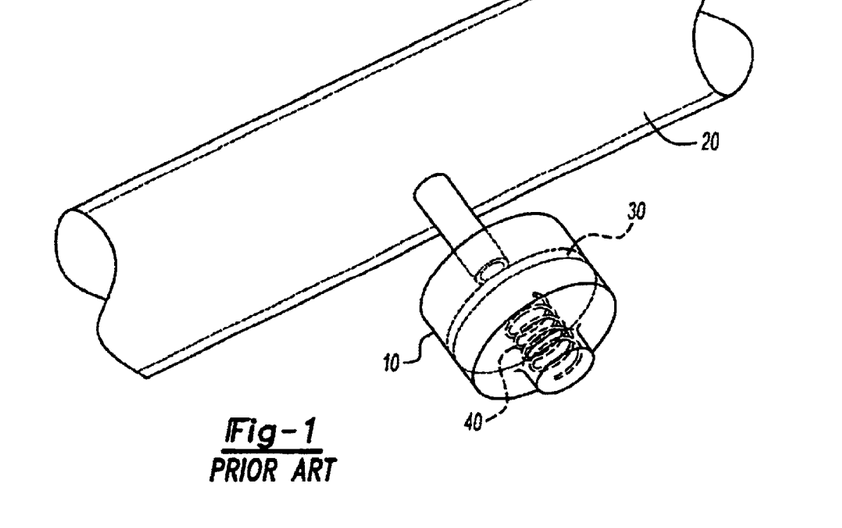
FIG. 1 is a view of a prior art hydraulic system, such as a fuel system, with a conventional compliance damper.

Referring now to the drawings, FIG. 1 illustrates a conventional hydraulic pulse damping system, such as used in a fuel system. Pressure pulsations in many hydraulic systems are a natural results of inputs to and outputs from the system. AS discussed above, these pressure pulsations can add unwanted pressure fluctuations at the fuel injector noise, vibration and/or harshness to the operation of the system throughout the operating frequency range of the system. At particular operating frequencies, the pulsations may correspond with harmonic modes of the fuel system, sometimes causing pressure magnitudes in excess of ten times that experienced during periods of non-harmonic frequency operation. Designers of fluid systems in general, and fuel systems in particular, are forced to develop systems which operate in frequency ranges that avoid major harmonic frequencies of the system while achieving an acceptable overall noise performance based on average pulsation magnitudes. Since these harmonics are component dependent, the addition or modification of a damper can alter the harmonic modes of the system, sometimes dropping a heretofore unseen harmonic in to the operating frequency range and designers can find themselves iteratively changing dampers to avoid this.

In the case of Fuel Systems, pressure pulsations result from pressure fluctuations in the fuel being input to the system from the fuel pump, from the pulsations that are a natural result of the pressure release or output occurring at each injector when it fires, and the interaction of these inputs and outputs among the fuel system components. In a conventional system, a damper (10) is often used in fluid communication with the fluid passage (20) to absorb fuel pressure fluctuations. In some systems, this damper can be as elementary as a thin wall in one of the fuel system components which flexes in response to pressure increases. In more complicated discrete dampers, such as the one illustrated, a flexible diaphragm (30) is supported by a spring (40) to absorb pulsation energy in the fluid passage (20). More and or larger compliance dampers are introduced in conventional systems to absorb energy and thus reduce the pulsations and their undesirable effects. Undesirable effects of pulsation include excessive noise, vibration and harshness. Undesirable noise, vibration and harshness are all associated with the maximum operating system pulse magnitude. By reducing this magnitude, the undesirable effects are likewise reduced. However, introducing more dampers or changing current dampers in a system can lower additional harmonic modes into the operating frequency range of the system, thereby introducing new maximum operating system pulse magnitudes that in turn must be overcome by additional changes to the damping system. This can result in a compromise in overall system performance in order to avoid certain harmonics.

Figure 2:
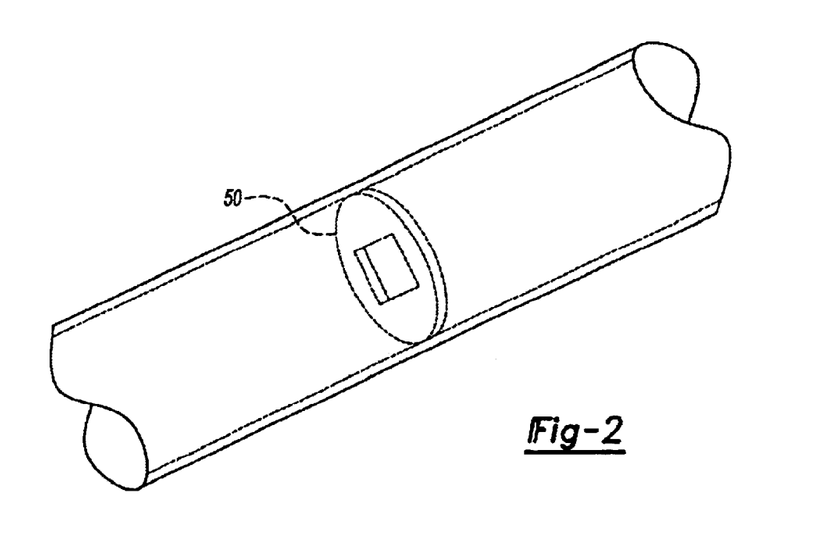
FIG. 2 is view of a hydraulic system, such as a fuel system with a restrictor in the fluid passage.

FIG. 2 shows a perspective view of hydraulic system, such as a fuel system, which includes a restrictor (50). It should be pointed out that all systems contain inherent compliance as a result of component material and design and configuration. Some recent designs incorporate the damping function of the system into the fuel rail wall design. In some systems, this built-in compliance can meet all of the required compliance need for performance of the system. In these cases, there may not necessarily be a discrete damper, as other system components provide this function. By properly sizing the restrictor, one can reduce the maximum operating system pulse magnitude without introducing new and unwanted harmonic modes. Optimum restrictor sizing is a function of many variables. Restrictor sizing can be affected by the effective rail diameter, the desired maximum operating system pulse magnitude, and the system damping coefficient, among other things. For a given effective rail diameter and system damping coefficient, the general equation relating restrictor dimension, r, to maximum operating system pulse magnitude, $M_L$, can be represented with the formula $M_L = A + Br + Cr^2$, where A, B and C are constants determined by system components and the choice of dimension r to be used in the equation. In some circumstances where r is reasonably small, the equation can be adequately represented by the formula $M_L = A + Br$. The dimension r can vary depending on the configuration of the restrictor, that is an orifice style restrictor configuration will have a different definition of r than a restrictor based on the principle of partially blocking the fuel passageway.

Figures 3, 4, 5:
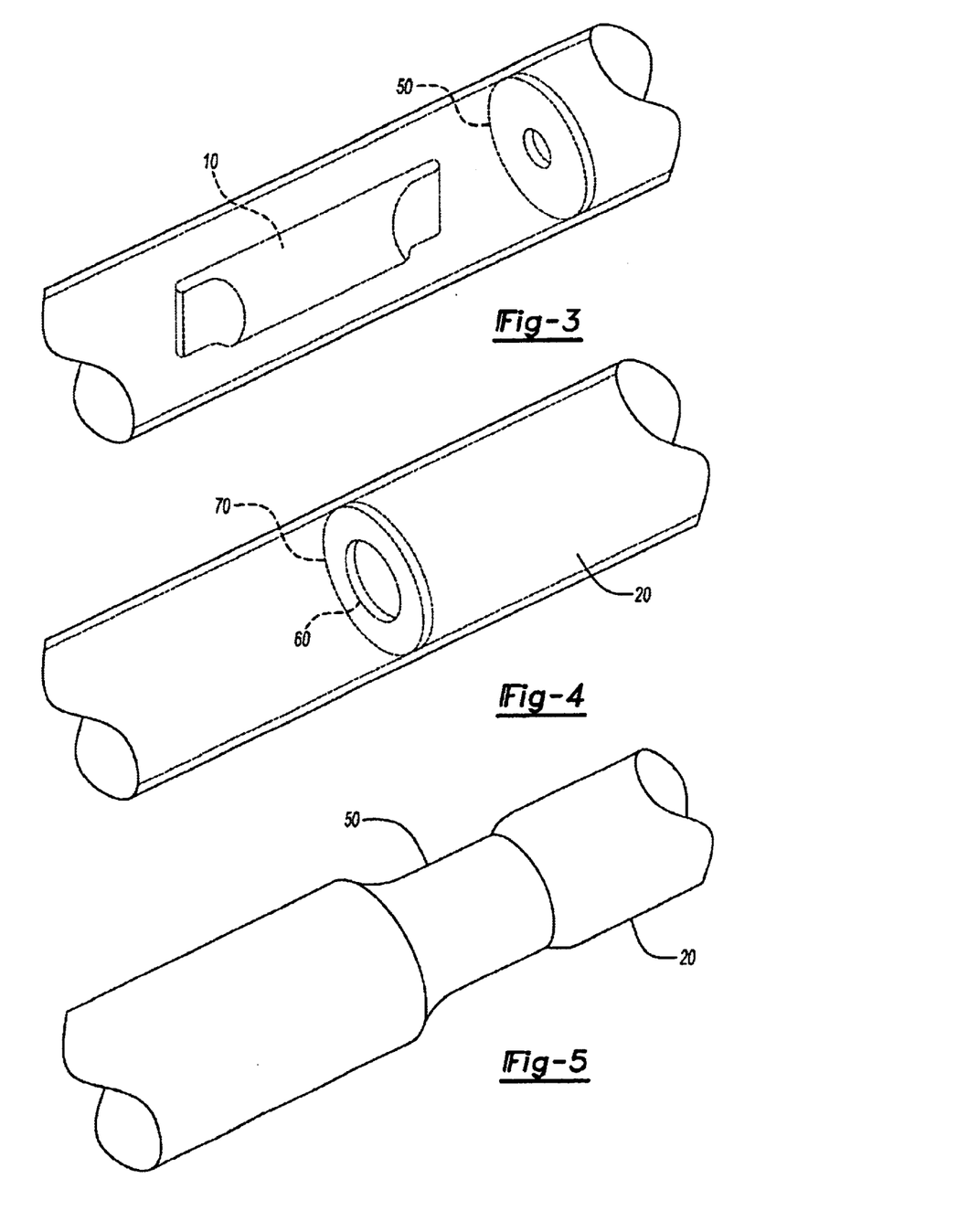
FIG. 3 is view of an automotive fuel system with a restrictor in the fluid passage and a compliant damper in fluid communication with the fuel.
FIG. 4 is a perspective view of an orifice style restrictor. Note that several orifice can be used in series to form a single restrictor if necessary.
FIG. 5 is a perspective view of a restrictor formed by a reduction in the diameter of the fuel passage.

FIG. 3 shows a perspective view of a fuel system incorporating a fuel damper and a restrictor. Note that in this example, the compliance damper (10) is an internal style of damper. The restrictor (50) is located a distance from the compliance damper (10). Adding a restrictor to an existing system can be a cost effective way of reducing unwanted noise, vibration and harshness without costly changes to the damper or fuel system component configuration. Addition of a restrictor may also allow the designer to avoid additional unwanted harmonic frequencies.

FIG. 4 describes an orifice style restrictor. In this particular example, an orifice (60) of specific diameter is formed in a plate (70). The plate is then attached inside the fluid passageway (20) so that fuel must flow through the orifice (60) as it is pumped through the fuel passage (20). Both round and polygonal holes can adequately serve as restrictors, though round are preferred from a manufacturing standpoint. Note that multiple restrictive structures, regardless of configuration, can be used together in series or even in parallel to form a single restrictor if necessary.

FIG. 5 shows a restrictor (50) formed by a reduction in the diameter of the fuel passage (20). Reductions can be introduced through swaging, crimping, and the addition of an insert into the fuel passageway, among other methods. This type of restrictor is often easier to form if one wants a longer restrictor. The length of the restrictor can affect various characteristics such as harmonic frequency and the performance of the restrictor in contributing to pulse damping.

Figure 6:
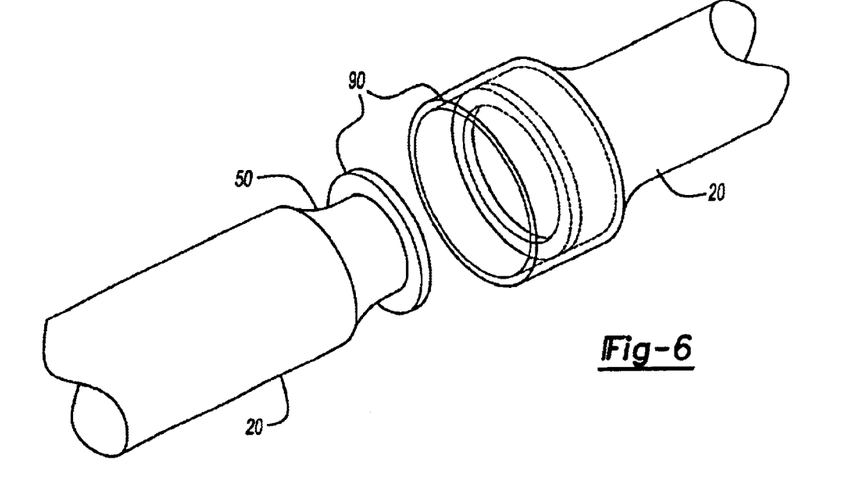
FIG. 6 is a perspective view of a restrictor formed by a connector in the fuel passage.

FIG. 6 shows one way to incorporate a restrictor (50) into the structure of a connector (90) that is used to connect two distinct portions of the fuel passage (20) together. Incorporation of a restrictor into a connector can be a cost effective way to add a restrictor to an existing fuel system.

Figure 7:
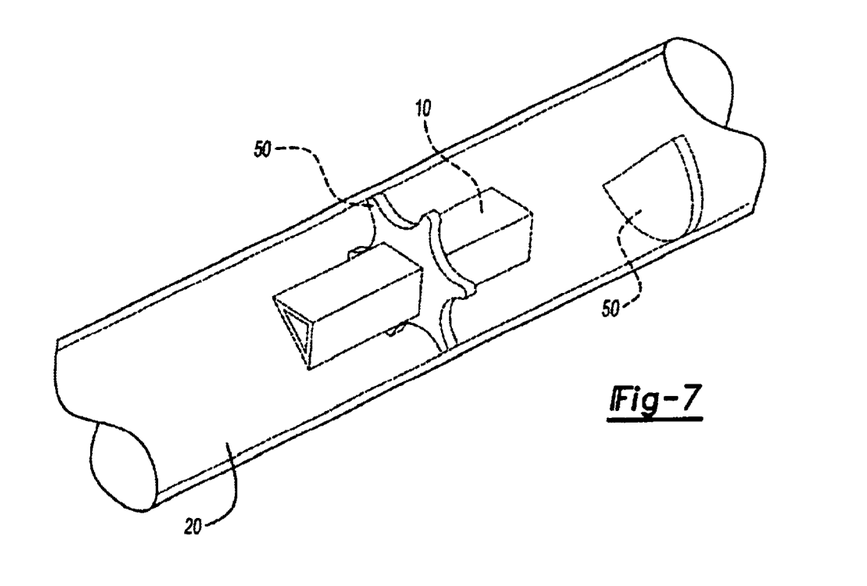
FIG. 7 is a perspective view of a restrictor formed by partially blocking the fuel passage.

FIG. 7 shows a restrictor (50) formed by partially blocking the fluid passageway (20). This type of blocking restrictor can take the form of a simple obstruction that occludes a portion of the fuel passageway or may be shaped to accommodate other functions such as supporting an internal damper (10). If the internal damper is designed correctly, it may serve as the blocking restrictor itself by its very presence in the fuel system passageway.

Figure 8:
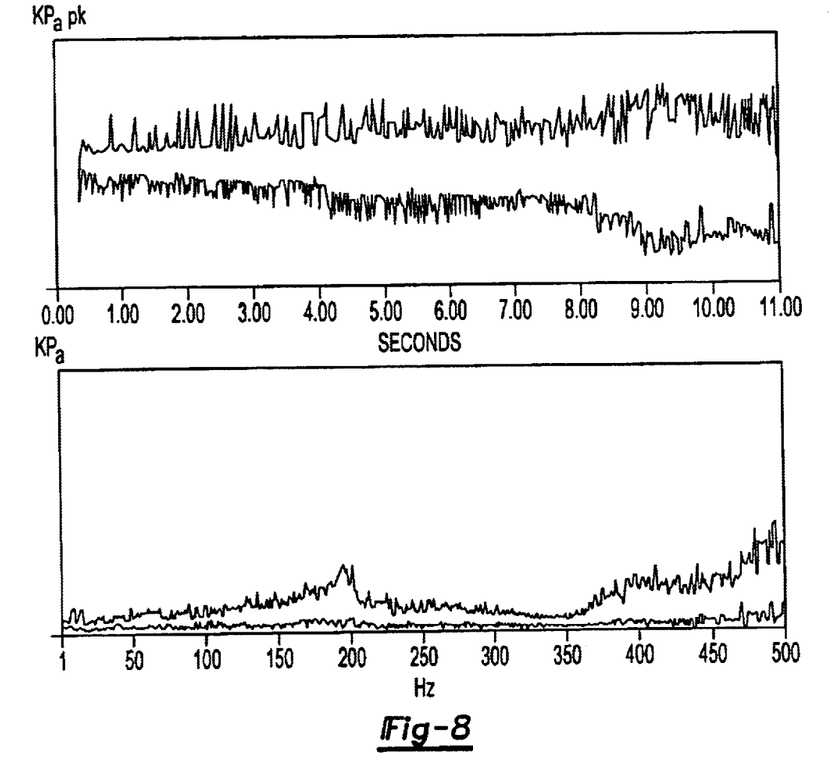
FIG. 8 is a co-plotted graph of a fuel system with no dampers or restrictors.

FIG. 8 shows two co-plotted graphs of an undamped fuel system. Note in the upper graph (kPa Vs. Time) that the greatest pulsation occurs at higher frequencies. The lower graph (kPa Pk vs. Hz) indicates the peak frequency occurs at almost 500 Hz.

Figure 9:
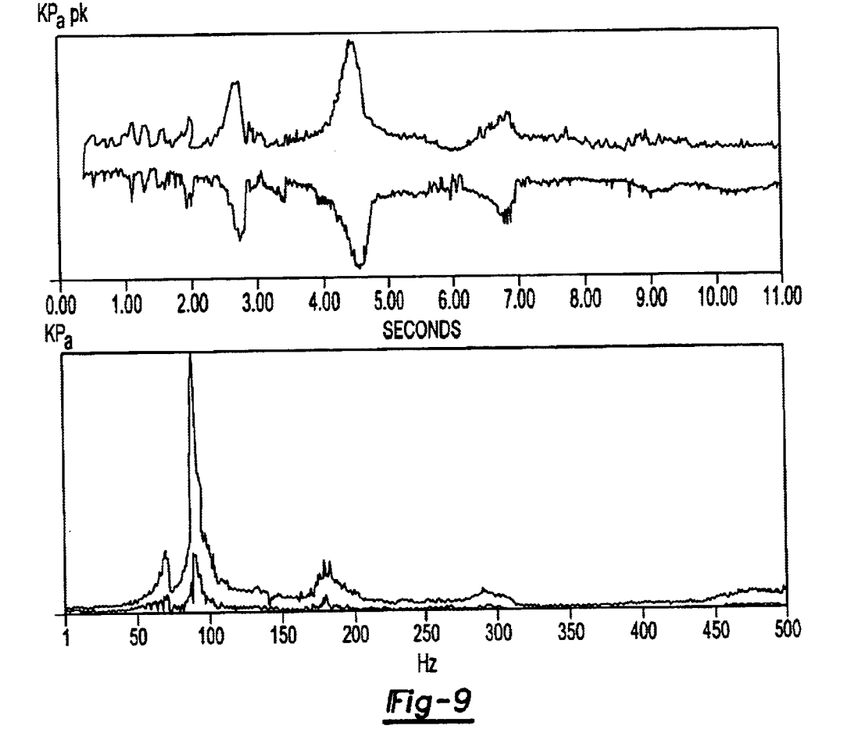
FIG. 9 is a graph of a fuel system from FIG. 8 with the addition of a damper.

FIG. 9 shows two co-plotted graphs of the pressure fluctuation in a conventional two bank, eight-cylinder fuel system using two compliance dampers. Note the magnitude of the maximum operating system pulse in the upper graph. In the upper graph (kPa vs Time) the maximum operating system pulse magnitude occurs in a much lower frequency than in the undamped rail of FIG. 8. The lower graph (kPa Pk vs. Hz) indicates the peak frequency is now significantly lower in the spectrum, but that the magnitude is substantially greater. This illustrates how dampers can reduce overall pulsations, but introduce new harmonics and increase pulsations magnitudes at these new points—introducing further problems.

Figure 10:
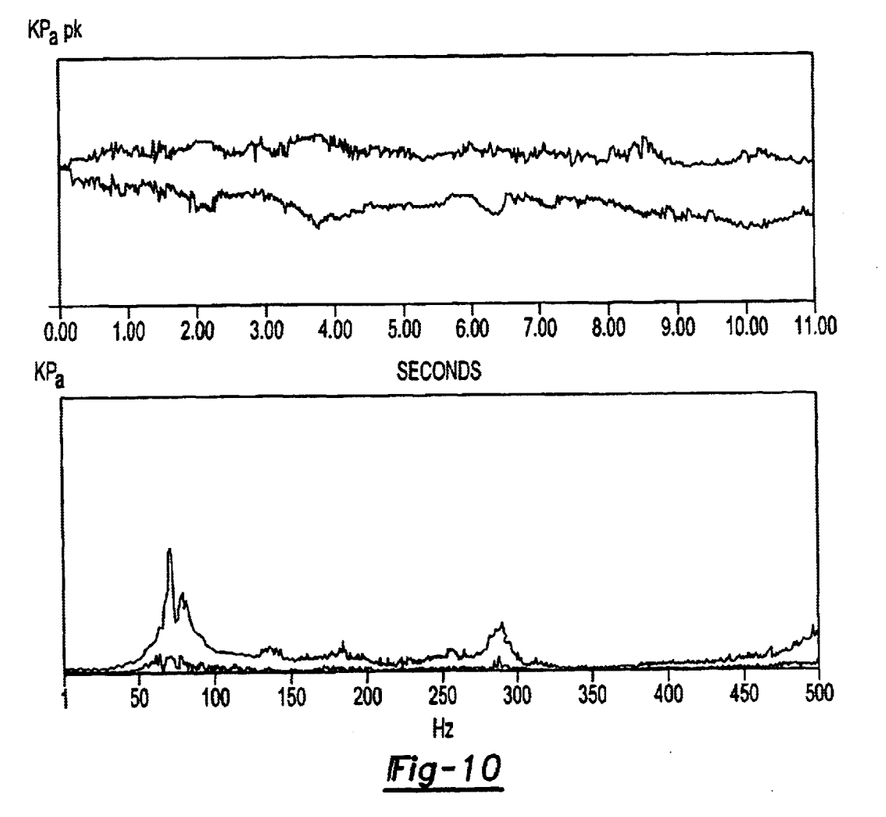
FIG. 10 is a graph of a fuel system from FIG. 9 with the addition of two restrictors.

FIG. 10 shows the effect of adding two appropriately sized restrictors to the conventional fuel system of FIG. 9. In the upper co-plotted graph (kPa vs Time) note the substantial reduction in the maximum operating system pulse magnitude. The lower graph (kPa Pk vs Hz) indicates a substantial reduction in the maximum operating system pulse magnitude at a critical harmonic frequency of about 60 Hz which was introduced by the addition of the dampers. While restrictors in general improve the performance of the system, sizing the restrictors appropriately for the system can optimize the performance, especially if the goal is reducing the maximum operating system pulse magnitude.

Figure 11:
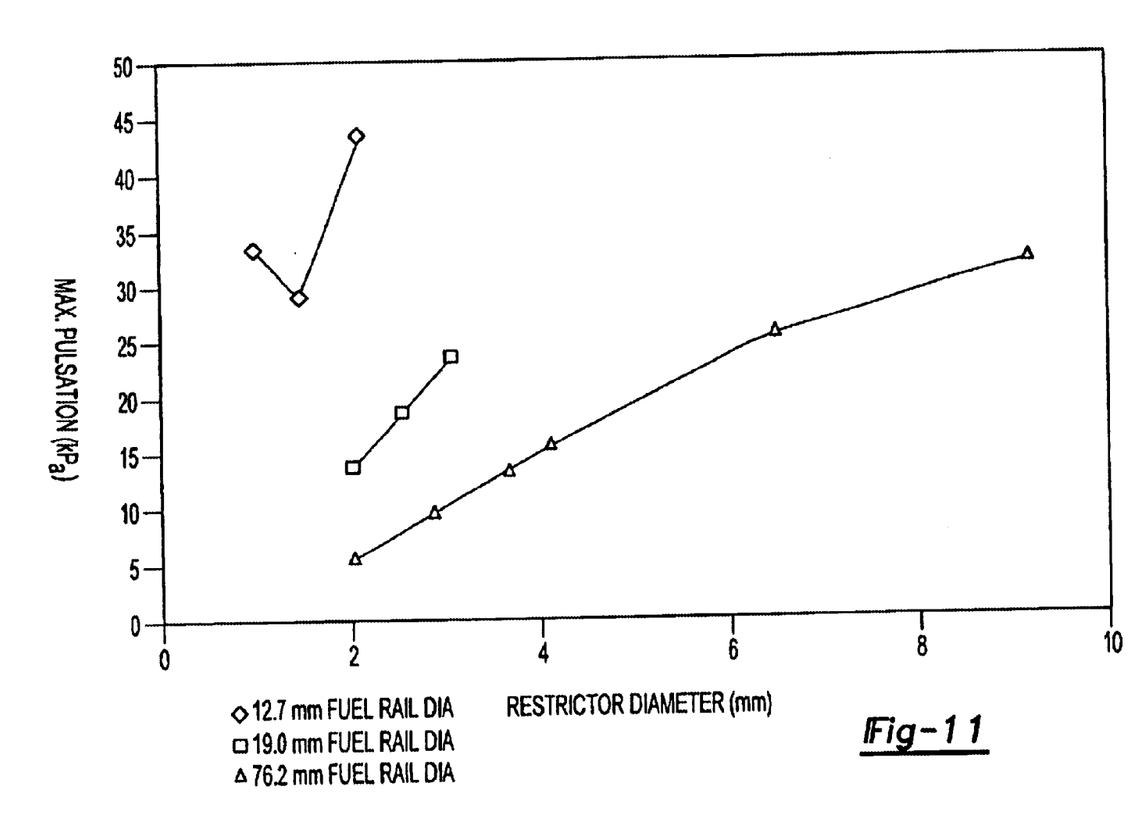
FIG. 11 is a graph of the relation of restrictor dimension to the maximum operating system pulse magnitude.

FIG. 11 is a graph of the restrictor dimension (orifice diameter of an orifice restrictor in this case) against the maximum operating system pulse magnitude. The relation between the restrictor dimension and the pulse magnitude can be seen. For this graph, three fuel rail diameters were analyzed: 12.7 mm, 19 mm and 76 mm. For a given rail size, the graph illustrates how a given restrictor orifice diameter (x scale) affects the maximum operating system pulse magnitude (y scale). It can be seen in the 12.7 mm rail diameter curve that an optimum restrictor size exists for a given system. Note the poor performance of the smallest restrictor, due to the large pressure drop of that restrictor in that particular fuel system configuration, which resulted in injector starvation and a resultant increase in fuel pressure pulsations.

What is claimed is:

1. A fuel system for a motor comprising:
   (a) a fuel pump to provide pressurized fuel;
   (b) a fuel rail defining, at least one fuel passageway therein, said fuel rail being in fluidic communication with said fuel pump to receive pressurized fuel therefrom;
   (c) a fuel injector in fluidic communication with said fuel rail to deliver fuel to an engine of the motor vehicle; (d) a fuel pressure pulse damping system including at least one restrictor located within said at least one fuel passageway, wherein said at least one restrictor substantially limits a maximum operating system pulse magnitude, said at least one restrictor reducing a cross sectional flow area of said at least one fuel passageway without introducing compliancy into the system.

2. A fuel pressure damping system according to claim 1, further comprising at least one compliance damper.

3. A fuel pressure damping system according to claim 1, wherein each of said at least one restrictor are further comprised of at least one orifice.

4. A fuel system according to claim 1, wherein each of said at least one restrictor is formed by reducing a diameter of at least one of said at least one fuel passageway.

5. A fuel system according to claim 1, wherein said at least one restrictor is formed at a connection in at least one of said at least one fuel passageway.

6. A fuel system according to claim 1, wherein said at least one restrictor is formed by partially blocking at least one of said at least one fuel passageway.

7. A fuel system according to claim 1, wherein said value of maximum operating system pulse magnitude, $M_L$, and a dimension r of said restrictor are substantially related by the formula $M_L = A + Br$.

8. A fuel system according to claim 1, wherein said value of maximum operating system pulse magnitude, $M_L$, and a dimension r of said restrictor are substantially linearly related.

9. A fuel system according to claim 1, wherein said value of maximum operating system pulse magnitude, $M_L$, and a dimension r of said restrictor are substantially inversely related.

10. A fuel system according to claim 1, wherein said value of maximum operating system pulse magnitude, $M_L$, and a dimension r of said restrictor are substantially related by the formula $M_L = A + Br + Cr^2$.

11. A fuel system according to claim 1, further wherein a maximum operating system pulse magnitude, $M_L$, is imposed upon the fuel system by a dimension r of said restrictor that is substantially related to $M_L$ by the formula $M_L = A + Br + Cr^2$.

12. A method of limiting the maximum operating system pulse magnitude of a fuel system comprising the steps of:
   (a) Providing a fuel system with at least one fuel passage; and,
   (b) introducing a restriction, having a dimension r, in said at least one fuel passage, without introducing compliancy into the system said dimension r having a relation to a limited maximum operating system pulse magnitude, $M_L$, substantially in accordance with the formula $M_L = A + Br$.

13. A method of limiting the maximum operating system pulse magnitude of a fuel system comprising the steps of:
   (a) Providing a fuel system with at least one fuel passage; and,
   (b) introducing a restriction, having a dimension r, in said at least one fuel passage without introducing compliancy into the system, said dimension r having a relation to a limited maximum fuel system pulsation magnitude, $M_L$, substantially in accordance with the formula $M_L = A + Br + Cr^2$.

14. A fuel system according to claim 1, wherein said compliance damper is an internal style damper.

15. The method of claim 12 further comprising the step of providing compliancy in the system with a means other than the restriction.

16. The method of claim 13 further comprising the step of providing compliancy in the system with a means other than the restriction.

* * * * *